(12) United States Patent
Morandin

(10) Patent No.: US 11,952,997 B2
(45) Date of Patent: Apr. 9, 2024

(54) OPERATING METHOD OF A COMPRESSOR OF A REFRIGERATING MACHINE AND COMPRESSOR OF A REFRIGERATING MACHINE

(71) Applicant: CAREL INDUSTRIES S.p.A., Brugine (IT)

(72) Inventor: Mattia Morandin, Brugine (IT)

(*) Notice: Subject to any disclaimer, the term of this patent is extended or adjusted under 35 U.S.C. 154(b) by 481 days.

(21) Appl. No.: 17/309,598

(22) PCT Filed: Dec. 10, 2019

(86) PCT No.: PCT/IB2019/060600
§ 371 (c)(1),
(2) Date: Jun. 9, 2021

(87) PCT Pub. No.: WO2020/121183
PCT Pub. Date: Jun. 18, 2020

(65) Prior Publication Data
US 2022/0049692 A1    Feb. 17, 2022

(30) Foreign Application Priority Data
Dec. 10, 2018  (IT) .................. 102018000010932

(51) Int. Cl.
*F04B 49/06*  (2006.01)
*F04B 35/04*  (2006.01)

(52) U.S. Cl.
CPC ........... *F04B 49/065* (2013.01); *F04B 35/04* (2013.01); *F04B 2203/0201* (2013.01); *F04B 2203/0202* (2013.01); *F04B 2203/0204* (2013.01)

(58) Field of Classification Search
CPC .............. F04B 49/065; F04B 35/04; F04B 2203/0201; F04B 2203/0202;
(Continued)

(56) References Cited

U.S. PATENT DOCUMENTS 4,083,001 A * 4/1978 Paice ................. G01R 31/343
                                              374/E7.018
5,502,360 A * 3/1996 Kerkman ............ H02P 21/16
                                                      318/811
(Continued)

FOREIGN PATENT DOCUMENTS

EP    2392070 A2    12/2011
EP    3076543 A1    10/2016
WO    2010086729 A2  8/2010

OTHER PUBLICATIONS

International Search Report & Written Opinion dated Feb. 26, 2020 from PCT Application No. PCT/IB2019/060600.

*Primary Examiner* — Christopher S Bobish
(74) *Attorney, Agent, or Firm* — INNOVATION CAPITAL LAW GROUP, LLP; Vic Lin

(57) ABSTRACT

An operating method is used for a compressor of a refrigerating machine, where the compressor includes an electric motor- and a power supply device configured to modulate a supply voltage and/or current and/or frequency for driving an electric motor. The method includes (a) setting a stator resistance calibration value and at least one threshold value for a control parameter, the threshold value being correlated to the calibration value; (b) injecting, continuously during operation of the electric motor, a disturbance signal into the electric motor (c) detecting a resulting voltage signal and a resulting current signal, corresponding to the perturbation signal; (d) associating with the control parameter a value calculated as a function of the resulting voltage signal and a resulting current signal; and (e) regulating or interrupting the supply voltage and/or current and/or frequency depending on the control parameter with respect to the at least one threshold value.

20 Claims, 3 Drawing Sheets

(58) Field of Classification Search
CPC .......... F04B 2203/0204; H02P 29/032; H02P 29/60; H02P 29/64; H02P 21/16
See application file for complete search history.

(56) References Cited

U.S. PATENT DOCUMENTS

| | | | | |
|---|---|---|---|---|
| 5,510,687 | A * | 4/1996 | Ursworth | H02H 7/0833 |
| | | | | 318/806 |
| 6,621,291 | B2 * | 9/2003 | Lee | G01R 31/346 |
| | | | | 324/765.01 |
| 6,925,823 | B2 | 8/2005 | Lifson et al. | |
| 8,384,338 | B2 * | 2/2013 | Lu | H02P 21/16 |
| | | | | 702/183 |
| 9,647,602 | B1 * | 5/2017 | Simili | H02P 21/143 |
| 10,389,285 | B2 * | 8/2019 | Magee | H02P 21/14 |
| 11,637,517 | B2 * | 4/2023 | Godbersen | H02P 21/16 |
| | | | | 318/400.01 |
| 2003/0062870 | A1 * | 4/2003 | Royak | H02P 6/185 |
| | | | | 318/727 |
| 2004/0080333 | A1 * | 4/2004 | Klein | H02H 6/005 |
| | | | | 374/185 |
| 2009/0051311 | A1 * | 2/2009 | Lu | H02P 23/14 |
| | | | | 318/806 |
| 2010/0194329 | A1 * | 8/2010 | Lu | H02P 21/141 |
| | | | | 318/798 |
| 2012/0306422 | A1 | 12/2012 | Hao et al. | |
| 2015/0198361 | A1 | 7/2015 | Peng et al. | |
| 2016/0315572 | A1 | 10/2016 | Magee et al. | |

* cited by examiner

OPERATING METHOD OF A COMPRESSOR OF A REFRIGERATING MACHINE AND COMPRESSOR OF A REFRIGERATING MACHINE

The present invention relates to an operating method for a compressor of a refrigerating machine and a compressor of a refrigerating machine.

In particular, the present invention relates to an operating method for an electric motor, in particular a synchronous motor, of a refrigerating machine compressor, able to prevent the deterioration of said motor during operation of the compressor.

The present invention relates, moreover, to a refrigerating machine compressor able to prevent deterioration of its electric motor so as to increase the reliability and the working life thereof.

The present invention also relates to a refrigerating machine provided with said compressor.

In the technical field of compressors a known method is described in European patent application EP3076543 which relates to a method for protecting the integrity of an electric motor.

According to this method an estimate of the average resistance of each winding of the electric motor is performed.

Said estimate is based on the application of Ohm's law in relation to a direct voltage applied to the windings.

In particular, in the case of three-phase motors, the voltage is applied between a terminal and the other two terminals cyclically, for example every three seconds.

Taking into account the transients generated by such a cyclical power supply, the monitoring performed according to the method of EP3076543 is estimated to cover 83% of the power supply time. In practice, therefore, this method monitors the state of the motor discontinuously, there being a time gap of not less than 17% of the activity time.

This drawback is moreover exacerbated by the fact that, as a result of alternation of the power supply, in order to obtain a reliable estimate of the stator resistance it is required to wait for operation under working conditions.

This results in a delay of a few minutes, following change-over of the power supply terminals, in order to obtain a reliable estimate. The document EP3076543 therefore recognizes that it is essential to monitor continuously the temperature of an electric motor, but does not propose a novel idea able to solve this problem, considering that for a significant time period during operation of the motor, monitoring is not active and for a further significant monitoring time period, this does not result in a reliable estimate of the temperature. Nowadays, in fact, the critical effect of any overheating or excessive cooling of the electric motor of a compressor of a refrigerating machine is known.

Said overheating may be due to electrical overloading of the stator windings or overheating of the surrounding environment or a lack of refrigeration or also a lack or shortage of lubricating oil in the electric motor.

The problem underlying the present invention is that of preventing the occurrence of thermal overloading of the motor of the compressor of a refrigerating machine.

"Thermal overloading" is understood as meaning both anomalous heating and anomalous cooling.

The main task of the present invention consists in providing an operating method for a compressor of a refrigerating machine, and a compressor of a refrigerating machine, which are able to provide a solution to this problem.

In connection with this task an object of the present invention is to propose an operating method for a compressor of a refrigerating machine and a compressor of a refrigerating machine which are able to detect the initial overheating of the electric motor of the compressor or sudden cooling thereof due for example to the presence of cooling liquid in the compressor.

Another object of the present invention is to provide an operating method for a compressor of a refrigerating machine and a compressor of a refrigerating machine which are able to detect initial overheating or sudden cooling without requiring modification or prior adaptation of the electric motor.

Yet another object of the invention consists in proposing an operating method for a compressor of a refrigerating machine and a compressor of a refrigerating machine which are such that the compressor may be stopped before a thermal overload condition occurs in the motor.

A further object of the invention is to provide an operating method for a compressor of a refrigerating machine which allows simplification of the refrigerating machine comprising it and/or its control method.

Yet another object of the present invention is to propose an operating method for a compressor of a refrigerating machine which, while ensuring simplification of the refrigerating machine comprising it, is able to ensure the same level of operational safety, and to preferably increase it, compared to conventional refrigerating machines.

This task and these and other objects which will appear more clearly below are achieved by an operating method for a compressor of a refrigerating machine, a compressor of a refrigerating machine, and a refrigerating machine, according to the attached independent claims.

Detailed characteristic features of an operating method for a compressor of a refrigerating machine, and a compressor of a refrigerating machine according to the invention are contained in the dependent claims.

Further characteristic features and advantages of the invention will emerge more clearly from the description of a preferred, but non-exclusive embodiment of an operating method for a compressor a refrigerating machine, a compressor of a refrigerating machine and a refrigerating machine according to the invention, illustrated by way of a non-limiting example in the attached sets of drawings in which.

Figure 1:
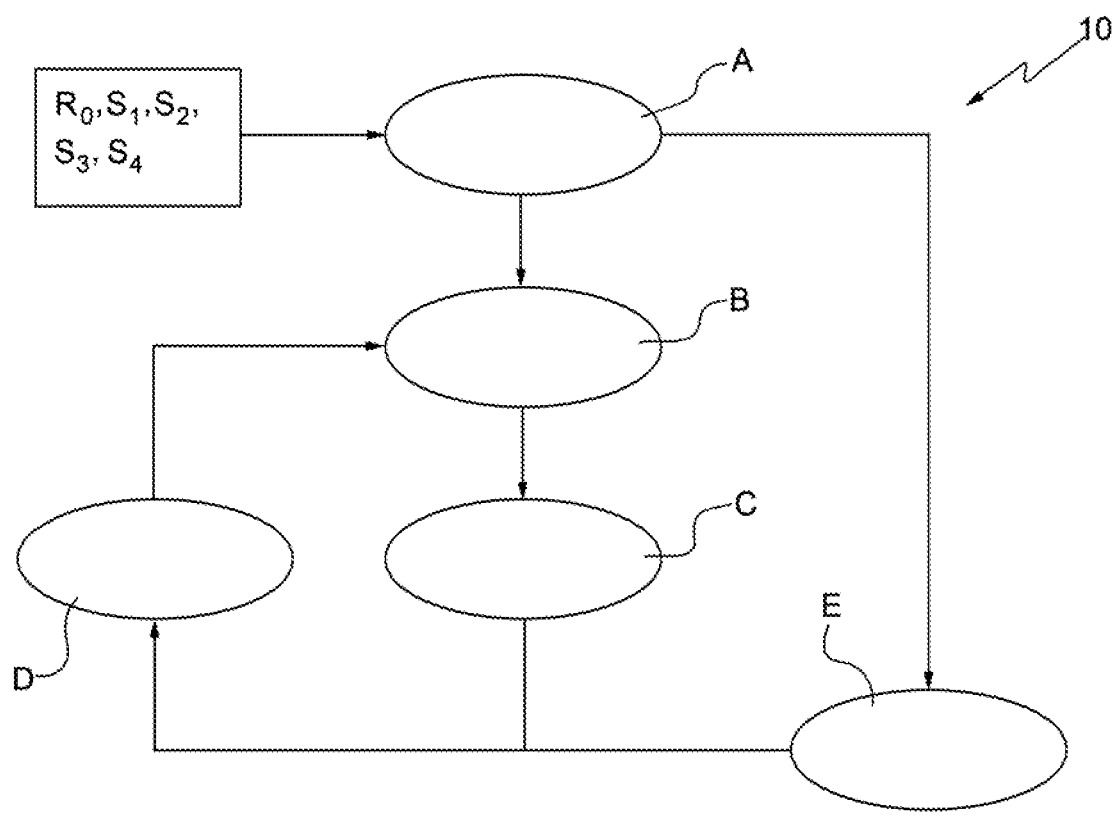
FIG. 1 shows a simplified flow diagram of an operating method for a compressor of refrigerating machine according to the present invention.
Figure 2:
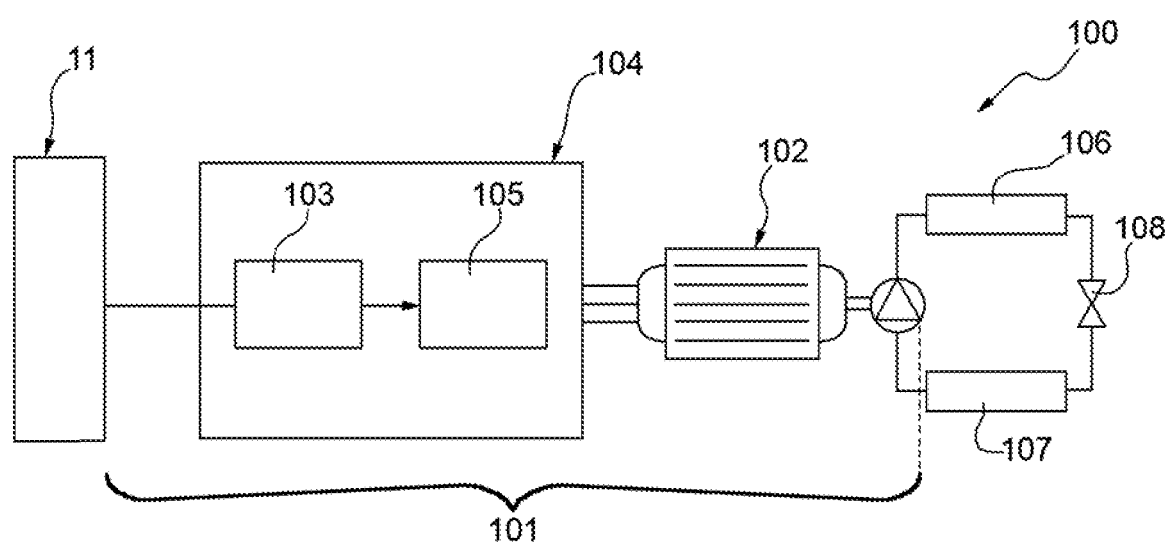
FIG. 2 shows a simplified diagram of a refrigerating machine according to the present invention.

With particular reference to the figures mentioned, 10 denotes overall an operating method for a compressor 101 of a refrigerating machine 100, in which the compressor 101 comprises an electric motor 102, which is preferably a synchronous motor, and a power supply device 103 configured to modulate a supply voltage V and/or current I and/or the frequency F suitable for driving the electric motor 102.

Preferably the power supply device comprises or consists of an inverter or a static converter.

In accordance with the present invention, the operating method 10 has a special feature in that it involves the following steps:

a step A of setting a stator resistance calibration value Ro and at least one threshold value S1, S2, S3, S4 for a control parameter R, the at least one threshold value S1, S2, S3, S4 being correlated to the calibration value Ro;

a step B of injecting, continuously during operation of the electric motor 102, a disturbance signal V1 or I1 into the electric motor 102, for example by means of the power supply device 103; the disturbance signal V1 or I1 consisting of a disturbance of the supply voltage V and/or current I;

a step C of detecting, by means of voltage and current measurements at the phases of the electric motor 102, a resulting voltage signal V2 and a resulting current signal I2, corresponding to is the disturbance signal V1, I1;

a step D of associating with the control parameter R a value calculated as a function of the resulting voltage signal V2 and resulting current signal I2;

a step E of regulating or interrupting the supply voltage V and/or current I and/or regulating or zeroing the supply frequency F depending on the value of the control parameter R with respect to the at least one threshold value S1, S2, S3, S4.

Preferably, the step E of regulating or interrupting the voltage V and/or current I and/or regulating or zeroing the supply frequency I depending on the value of the control parameter R with respect to the at least one threshold value S1, S2, S3, S4, involves regulating or interrupting the supply voltage V and/or current I and/or zeroing the supply frequency F in the case where the control parameter R is equal to or exceeds the at least one threshold value S1, S2, S3, S4. As described more fully below, in some embodiments of the present invention, the disturbance signal and the resulting signal may consist of a voltage signal and the control parameter R may consist of an estimate of the stator resistance derived, for example by means of Ohm's law, from the voltage variation at the terminals of the stator windings defined by the difference between the disturbance signal and the resulting signal.

Moreover, with reference to the aforementioned step B, the expression "injecting continuously a disturbance signal" is understood as meaning that the disturbance signal is injected is directly or indirectly, without interruption, in all the terminals of the motor, without changing the injection terminal, such that the control parameter R is effectively detected for 100% of the operation time of the compressor 101.

Advantageously, the step C of detecting the resulting signal V2 or I2 involves separating, from the supply voltage V and/or current I, the resulting signal V2 or I2 for example by means of filtering, as described more fully below.

Basically, by means of the method according to the present invention, it is possible to monitor continuously, namely for a time period representing 100% of the operation time of the motor, the operating conditions of a compressor 101 of a refrigerating machine 100, detecting in good time any initial critical condition affecting operation thereof.

This condition, in fact, in accordance with the present method is detected when the control parameter R exceeds a predefined threshold S1, S2, S3 or S4.

In general the expression "exceeds" means both that the value of the control parameter increases until it is greater than the threshold value and that it decreases until it is less than the threshold value. The control parameter R, according to the present invention, generally is derived from the difference between a disturbance signal V1 or I1, injected into the electrical power supply of the electric motor 102 of the compressor 101, and a resulting signal V2 or I2 derived from the disturbance signal V1 or I1 and detected at the is output of the power supply device 103 and at the input of the electric motor 102.

Advantageously, the value associated with the control parameter R is an electrical resistance value calculated, by means of Ohm's law, on the basis of the calibration value Ro and the difference which exists between the resulting signal V2 or I2 and the disturbance signal V1 or I1.

In this case, by means of evaluation of the control parameter R, the variation in the average resistance of the stator of the electric motor 102 with respect to the calibration value Ro is estimated. This variation is indicative of a corresponding variation in temperature of the electric motor 102 which could result in overheating or excessive cooling and consequently damage to the motor itself and/or the compressor.

For example, the value of the control parameter R may be calculated, ideally, as $R = V2/I2$ or as $R = (V2/I2 - Ro)$ if a variation in resistance is associated with the control parameter.

As a result it is possible to deduce, from the value of the control parameter R, the integral state of the insulation of the electric motor winding by knowing the maximum resistance which the winding may have and with which the first threshold value S1 may be associated. The disturbance signal V1 or I1 advantageously has an intensity chosen so as not to adversely affect the operational efficiency of the electric motor 102.

In particular, preferably, the injection step B comprises a step of selecting the parameter to be disturbed, namely it involves selecting whether to disturb the voltage V or the current intensity I of the power supply of the electric motor 102.

Generally, the at least one threshold value S1, S2, S3, S4 preferably comprises at least:

a first upper threshold value S1 and a second upper threshold value S2, and advantageously also a first lower threshold value S3 and a second lower threshold value S4.

The step E of adjusting or interrupting the supply voltage V and/or current I and/or regulating or zeroing the supply frequency F advantageously involves:

reducing the value of the supply voltage V and/or current I and/or frequency F if the control parameter R assumes a value equal to or greater than the first upper threshold value S1 or less than the first lower threshold value S3 if provided; preferably for this purpose the supply frequency F of the electric motor 102 may be reduced;

zeroing the value of said supply voltage V and/or current I and/or frequency F if the control parameter R assumes a value equal to or greater than the second upper threshold value S2 or equal to or less than the second lower threshold value S4, if provided.

Clearly, depending on the particular implementation requirements, a method according to the present invention may involve a single threshold value which will be the second upper threshold value S2 or the second lower threshold value S4 which may be respectively a maximum value or a minimum value for the control parameter R and will comprise the step of zeroing the value of the supply voltage V and/or current I and/or frequency if the control parameter R assumes a value equal to or greater than the second upper threshold value S2 or if the control parameter R assumes a value equal to or less than the second lower threshold value S4, depending on the case.

In other embodiments of the method according to the invention, two threshold values may be provided: a maximum threshold and a minimum threshold for the value of the control parameter R, for example respectively identified with the second upper threshold value S2 and the second lower threshold value S4.

In this case, the method, according to the present invention, advantageously will comprise the step of zeroing the value of said supply voltage V and/or current I and/or frequency F if the control parameter R assumes a value equal to or greater than the second upper threshold value S2 or if the control parameter R assumes a value equal to or less than the second lower threshold value S4.

In this case a first upper threshold value S1, less than the second upper threshold value S2, and preferably also a first lower threshold value S3, greater than the second lower threshold value S4, may be provided.

The method according to the present invention in this case advantageously comprises a step of reducing the value of the supply voltage V and/or current I and/or frequency F if the control parameter R assumes a value equal to or greater than the first upper is threshold value S1, but less than the second upper threshold value S2, or less than the first lower threshold value S3, if applicable, but greater than the second lower threshold value S4.

Advantageously, the calibration value Ro is equal to an average resistance value of the stator of the electric motor 102, estimated at a predefined reference temperature, for example at the ambient temperature, for example at 25° C. or 0° C.

Generally, the disturbance signal I1, V1 may have an amplitude and, in the case where it is not a constant signal, a form (e.g. sinusoidal or square wave) and a frequency which depend on the characteristics of the compressor 102 of the particular application.

By way of example, the disturbance signal I1, V1, if not constant, advantageously may have a frequency which is sufficiently low (for example, it may be a signal close to a continuous signal) or sufficiently high (for example, switching frequency of the inverter 103) or in any case a frequency at least 5-10 times higher than the maximum frequency of the electric motor 102 so as not to disturb the normal operation of the motor 102.

In some embodiments of the present invention, the disturbance signal I1 may be a current signal.

In this case, the disturbance signal I1 advantageously is sufficiently small compared to the nominal current of the electric motor 102, for example it is equal to about 10% of the nominal current of the electric motor 102.

Alternatively, preferably the disturbance signal I1 is sufficiently large so that the voltage of the resulting signal V2 is between 0.5% and 2% of the voltage of the DC bus of the inverter.

For example, the disturbance signal I1 may have a direct current amplitude of 1A and the voltage derived therefrom may therefore vary from 0.9V to 1.5V.

In other possible embodiments of the present invention, the disturbance signal V1 is a voltage signal, where the electrical motor 102 is a three-phase motor.

In this case, preferably the disturbance signal V1 ranges between 1% and 5% of the nominal voltage of the electric motor 102 or will be sufficiently large so that the current of the resulting signal I2 is about 10% of the nominal current of the electric motor 102 so as to not to disturb the normal operation of the electric motor 102.

In this case, the disturbance signal V1, when energized, may be a voltage signal which consists of a disturbance in a first component V1x and/or a disturbance in a second component V1y in a system with two orthogonal components x, y.

As will be described further below, the system with two components x, y may for example be a stationary alpha-beta system or a d-q rotating system.

The supply voltage V in the system with two components x, y will have a first component Vpx and a second component Vpy and the step B will involve injecting the disturbance signal V1 selectively in a first mode, in a second mode or in a third mode.

The first mode involves injecting into the first component Vpx the is disturbance in the first component V1x.

The second mode involves injecting into the second component Vpy the disturbance in the second component V1y.

The third mode involves injecting into the first component Vpx the disturbance in the first component V1x and, at the same time, into the second component Vpy, the disturbance in the second component V1y.

In this case, the step C of detecting a resulting signal I2 involves:
  measuring phase currents Ia, Ib, Ic of the electric motor (102) and, from these, deriving equivalent currents Ix, Iy by means of conversion of the phase currents Ia, Ib, Ic into the system with two components x, y then
  deriving from the equivalent currents Ix, Iy the respective components Ix-meas and/or Iy-meas which can be attributed to the disturbance in the first component V1x and/or to the disturbance in the second component V1y, respectively.

Again in this case, the step C will comprise selectively:
  deriving the component of current Ix-meas, of the equivalent current Ix, if the disturbance signal (V1) has been injected in the first mode;
  deriving the component of current Iy-meas, of the equivalent current Iy, if the disturbance signal (V1) has been injected in the second mode;
  deriving both the components of current Ix-meas and Iy-meas, if the disturbance signal (V1) has been injected in the third mode.

The operation of deriving the components of current Ix-meas and/or Iy-meas may be performed by means of filtering of the equivalent currents Ix, Iy, where for example said filtering will be of the low-pass type if the equivalent currents Ix, Iy will be in a stationary alpha-beta reference system, or high-pass type, if the equivalent currents Ix, Iy will be in a d-q rotating reference system.

Moreover it is possible to perform a derivation operation which involves determining selectively:
  a component x of voltage Vx-meas, if the disturbance signal V1 has been injected in the first mode, or
  a component x of voltage Vy-meas, if said disturbance signal V1 has been injected in the second mode, or
  both a component x of voltage Vx-meas and a component y of voltage Vy-meas, if the disturbance signal V1 has been injected in the third mode.

The component x of voltage Vx-meas and/or the component y of voltage Vy-meas may be derived by means of a processing operation which may involve the following steps:
  measuring between the terminals of the phases of the electric motor 102 at least one line-to-line stator voltage Vab, Vbc, Vca;

determining a direct current component for each of the at least one line-to-line voltages Vab, Vbc, Vca, for example by means of at least one analog and/or digital low-pass filtering unit.

Generally, the value associated with the control parameter R may be an electrical resistance value calculated, by means of Ohm's law, selectively:
- as a ratio between a component x of voltage Vx-meas and the component x of current Ix-meas, where the component x of voltage Vx-meas is calculated on the basis of at least one direct current component of said at least one line-to-line voltage Vab, Vbc, Vca, if the disturbance signal (V1) has been injected in the first mode; or
- as a ratio between a component y of voltage Vy-meas and the component y of current Iy-meas, where the component y of voltage Vy-meas is calculated on the basis of at least one direct current component of a line-to-line voltage Vab, Vbc and/or Vca, if the disturbance signal (V1) has been injected in the second mode; or
- as a ratio between the component x of voltage Vx-meas and the component x of current Ix-meas and/or as a ratio between the component y of voltage Vy-meas and the component y of current Iy-meas, if the disturbance signal V1 has been injected in the third mode.

Preferably, in the case where the disturbance signal V1 has been injected in the third mode, both a first value Rx and a second value Ry are calculated for the control parameter R.

It is thus possible to define a reliability index to which a value equal to the difference between said first value and said second value of the control parameter R may be assigned.

The first value may be equal to the ratio between the component x of voltage Vx-meas and the component x of current Ix-meas.

The second value may be equal to the ratio between the component y of voltage Vy-meas and the component y of the current Iy-meas. In order not to disturb the normal operation of the compressor 101, and in particular to prevent the disturbance signal V1, when energized, from inducing in the stator windings currents such as to disturb the operation of the electric motor 103, then:
- the disturbance in the first component V1x consists of a voltage signal generated by a current regulator 19 on the basis of a current intensity defined as a function of a reference direct current value in x, Ix-ref, and the value of the component x of current Ix-meas;
- the disturbance in the second component V1y consists of a voltage signal generated by a current regulator 20 on the basis of a current intensity defined as a function of a reference direct current value in y, Iy-ref, and the value of the component y of current Iy-meas.

For example, the disturbance in the first component V1x or the disturbance in the second component V1y may be voltage signals generated by a current regulator 19, 20 so that the current correspondingly induced in the windings is for example not higher than 10% of the nominal current of the electric motor 102.

Advantageously, the reference direct current value in x, Ix-ref, and/or the reference direct current value in y, Iy-ref, are predefined so that the magnitude of the disturbance in the first component V1x and the magnitude of the disturbance in the second component V1y, respectively, are such as to determine an intensity of the component x of current Ix-meas and/or of the component y of current Iy-meas not greater than 10% of the intensity of said corresponding is equivalent currents Ix, Iy.

Hitherto the method 10 according to the present invention has been described with reference to the case of injection of the disturbance signal in general according to a two-component system.

This system may be advantageously either a stationary alpha-beta system or a d-q rotating system, known per se.

In this case the well-known Clarke and Park transforms will be applicable, respectively, these representing the three-phase system (i.e. the electric motor of the compressor), reducing the number of equations from 3 to 2 and therefore passing from the a, b, c system of the three-phase power supply to the stationary alpha-beta system or d-q rotating system.

In some embodiments of the present invention, therefore, the electric motor 102 is a balanced and symmetrical three-phase motor with zero sum of the line-to-line voltages and zero sum of the phase currents.

The system with two orthogonal components x, y advantageously is a stationary alpha-beta system where the first component x consists of the component alpha and the second component y consists of the beta component.

In this case, the disturbance signal V1 is preferably a direct voltage signal.

In this case, the balanced three-phase system, which can be represented by means of the variables $g_a(t)$, $g_b(t)$ and $g_c(t)$, with zero homopolar component $g_0(t)=0$, which is the condition typically satisfied for all the electric motors, and non-accessible neutral point of the electric motor 102, has:

$$g_0(t) = \frac{g_a(t) + g_b(t) + g_c(t)}{3} = 0$$

It is therefore possible to define the generic spatial vector of these variables as:

$$\overline{g}(t) = \frac{2}{3}\left[g_a(t) + g_b(t)e^{j\frac{2}{3}\pi} + g_c(t)e^{j\frac{4}{3}\pi}\right] = g_\alpha(t) + jg_\beta(t)$$

It is therefore possible to calculate the two new components as real part and imaginary part of the generic spatial vector g(t):

$$g_\alpha(t) = \text{Re}\{\overline{g}(t)\} = \frac{2}{3}\left[g_a(t) - \frac{1}{2}g_b(t) - \frac{1}{2}g_c(t)\right] = g_a(t)$$

$$g_\beta(t) = \text{Im}\{\overline{g}(t)\} = \frac{2}{3}\left[\frac{\sqrt{3}}{2}g_b(t) - \frac{\sqrt{3}}{2}g_c(t)\right] = \frac{1}{\sqrt{3}}[g_b(t) - g_c(t)]$$

It can be noted that $g_\beta(t)$ minus a scale factor is directly a line-to-line variable $g_{bc}(t)$.

With reference to the line-to-line variables, the formulae proposed above may be rewritten as:

$$CH1 = g_a(t) - g_b(t); CH2 = g_b(t) - g_c(t)$$

$$g\alpha(t) = \frac{2}{3}\left(CH1 + \frac{1}{2}CH2\right)$$

$$g\beta(t) = \frac{1}{\sqrt{3}}CH2$$

The generic function g may, in the particular case, represent the current or the voltage according to the expressions of the line-to-line variables.

Therefore, in the case of the voltages, it will be:

$$V_{ab} = V_a(t) - V_b(t); V_{bc} = V_b(t) - V_c(t)$$

$$V_\alpha = \frac{2}{3}\left(V_{ab} + \frac{1}{2}V_{bc}\right)$$

$$V_\beta(t) = \frac{1}{\sqrt{3}}V_{bc}$$

The component x of voltage Vx-meas and/or the component y of voltage Vy-meas may be calculated, by means of the Clark transform formulae, from the line-to-line stator voltages measured at the windings of said electric motor 102.

Therefore, in detail, replacing the generic subscript "x" or "y" with that of the present example, i.e. "alpha" and "beta" respectively:

$$Valfa-meas = \frac{2}{3}\left(Vab + \frac{1}{2}Vbc\right)$$

$$Vbeta-meas = \frac{1}{\sqrt{3}}Vbc$$

As already mentioned above generally, the disturbance signal V1 or I1 may be injected in a multiple manner.

Therefore, with reference to the present example, in the stationary alpha-beta reference system of the electric motor 102 the disturbance signal V1 or I1 may be injected both in alpha and in beta, in order to obtain several redundant channels which converge towards the same result, it being possible to identify any imprecision in the measurement channels used, thus increasing the safety of the measurement.

In other embodiments of the present invention, as mentioned above, the system with two orthogonal components x, y is a d-q rotating system where the first component x consists of the component d and the second component y consists of the component q.

In this case also, the electric motor 102 is a balanced and symmetrical three-phase motor with zero sum of the line-to-line voltages and zero sum of the phase currents where the disturbance signal (V1) is an alternating voltage signal with a frequency equal to the rotation frequency of the electric motor 102.

In this case, the component x of voltage Vx-meas and/or the component y of voltage Vy-meas may be calculated, in a manner known per se, by means of the Park transform formulae, from the line-to-line stator voltages measured at the windings of the electric motor 102.

As mentioned further above in general and in the case of injection in the stationary alpha-beta system, now, with reference to the present example, the disturbance signal V1, I1 may be injected in the d-q rotating reference system of the electric motor 102 both into the component d and into the component q, in order to have more redundant channels which converge towards the same result, it being possible to identify any imprecision in the measurement channels used, thus increasing the safety of the measurement.

Generally, in accordance with the method of the present invention, is instead of injecting the disturbance signal into a two-component system, it may be injected directly into the three-component a-b-c system.

In this case, the disturbance signal V1 is a direct voltage signal which consists of a disturbance in at least one of the line-to-line voltages Vab, Vbc, Vca of the electric motor (102).

In this case:
the injection step B may involve injecting the disturbance signal V1 into at least one of the line-to-line voltages Vab, Vbc, Vca;
the step C of detecting a resulting signal I1 may involve measuring phase currents Ia and Ib if a signal is injected in Vab, and/or Ib and Ic if a signal is injected in Vbc and/or Ic and Ia if a signal is injected in Vca, of the electric motor 102 and deriving, from these, components Ia-meas and Ib-meas and/or Ib-meas and Ic-meas and/or Ic-meas and Ia-meas, respectively, which can be attributed to the disturbance in at least one of the line-to-line voltages Vab, Vbc, Vca of the electric motor 102.

In order to derive the current components Ia-meas, Ib-meas and Ic-meas it will be possible to use a low-pass filter of the first order to filter the phase currents Ia, Ib, Ic.

This filter may, for example, be a passive RC circuit with a cut-off frequency close to 10 Hz.

The value associated with the control parameter R may be an electrical resistance value calculated, by means of Ohm's law, as the ratio between a direct current component of line-to-line voltage Vab-meas, Vbc-meas and/or Vca-meas, which is measured between phases a-b, b-c and/or c-a of the electric motor 102, and the corresponding phases of the components Ia-meas and Ib-meas and/or Ib-meas and Ic-meas and/or Ic-meas and Ia-meas.

In general, once the value of the control parameter R has been calculated, in the case where it consists of an electrical resistance value, the corresponding average temperature T of the winding of the electric motor 102 may be estimated in a manner known per se. For example, with reference to the case described above of injection of the disturbance signal in a stationary alpha-beta system, where the disturbance signal consists of a voltage signal injected in alpha, the following formula is obtained:

$$R = \frac{V_{alfa-meas}}{I_{alfa-meas}}$$

$$T = T_o + \frac{R - R_0}{\delta_{0,cu} * R_0}$$

Where $T_0$ is a reference temperature, for example $T_0=0°$ C., $R_0$ is the resistance of the winding at the reference temperature $T_0$ and $\delta_{0,cu}$ is a coefficient of variation of the resistance with the temperature which, for example in the case of copper, is equal to 0.0042 1/° C. The method according to the present invention may therefore be applied for control of the temperature of an electric motor of a compressor of a refrigerating machine, in order to continuously monitor the temperature of the windings so as to react promptly to overheating or excessive cooling of the the said electric motor.

The present invention also relates to an operating apparatus 104 of a compressor 101 of a refrigerating machine 100.

The operating apparatus 104 comprises a power supply device 103 configured to modulate a supply voltage V and/or a current I and/or frequency F for driving the electric motor 102, which is preferably a synchronous motor.

According to the present invention, the operating apparatus 104 has a particular feature in that it comprises a detection device 105 which can be set by means of definition of a stator resistance calibration value Ro and at least one threshold value S1, S2, S3, S4 for a control parameter R, where the at least one threshold value S1, S2, S3, S4 is correlated to the calibration value Ro.

In particular, the detection device 105 is configured so that, during operation of the electric motor 102, it performs:
- a step B of injecting, continuously during operation of the electric motor 102, a disturbance signal V1, I1 into the electric motor 102, by means of the power supply device 103, the disturbance signal (V1, I1) consisting of a disturbance of the supply voltage V and/or current I;
- a step C of detecting, by means of voltage and current measurements at the phases of the electric motor 102, a resulting voltage signal V2 and a resulting current signal I2, corresponding to the disturbance signal V1, I1;
- a step D of associating with the control parameter R a value calculated as a function of said resulting voltage signal V2 and a resulting current signal I2;
- a step E of regulating or interrupting/zeroing the supply voltage V and/or current I and/or frequency F depending on the value of the control parameter R with respect to the at least one threshold value S1, S2, S3, S4.

In some embodiments, the operating apparatus 104 may have a compressor 101 with an electric motor 102 which may be three-phase and supplied by means of an inverter and which may have a nominal power of 6 kW, a maximum line-to-line voltage which may be equivalent to 400 Vrms, a maximum phase current of 10 Arms and having a phase resistance of the stator windings Ro which may be equal to 1 Ohm at 20° C.

From this data advantageously the following may be set:
- a second upper threshold value S2 of 1.5 Ohm at the maximum permissible temperature of the insulation class, and
- a second lower threshold value S4 at the minimum temperature of the compressor corresponding to 0.9 Ohm.

The present invention also relates to a refrigerating machine 100 which comprises at least one condenser member 106, at least one evaporator member 107, at least one throttling member 108 and at least one compressor 101 where the latter is provided with an operating apparatus 104 as described above.

Figure 3:
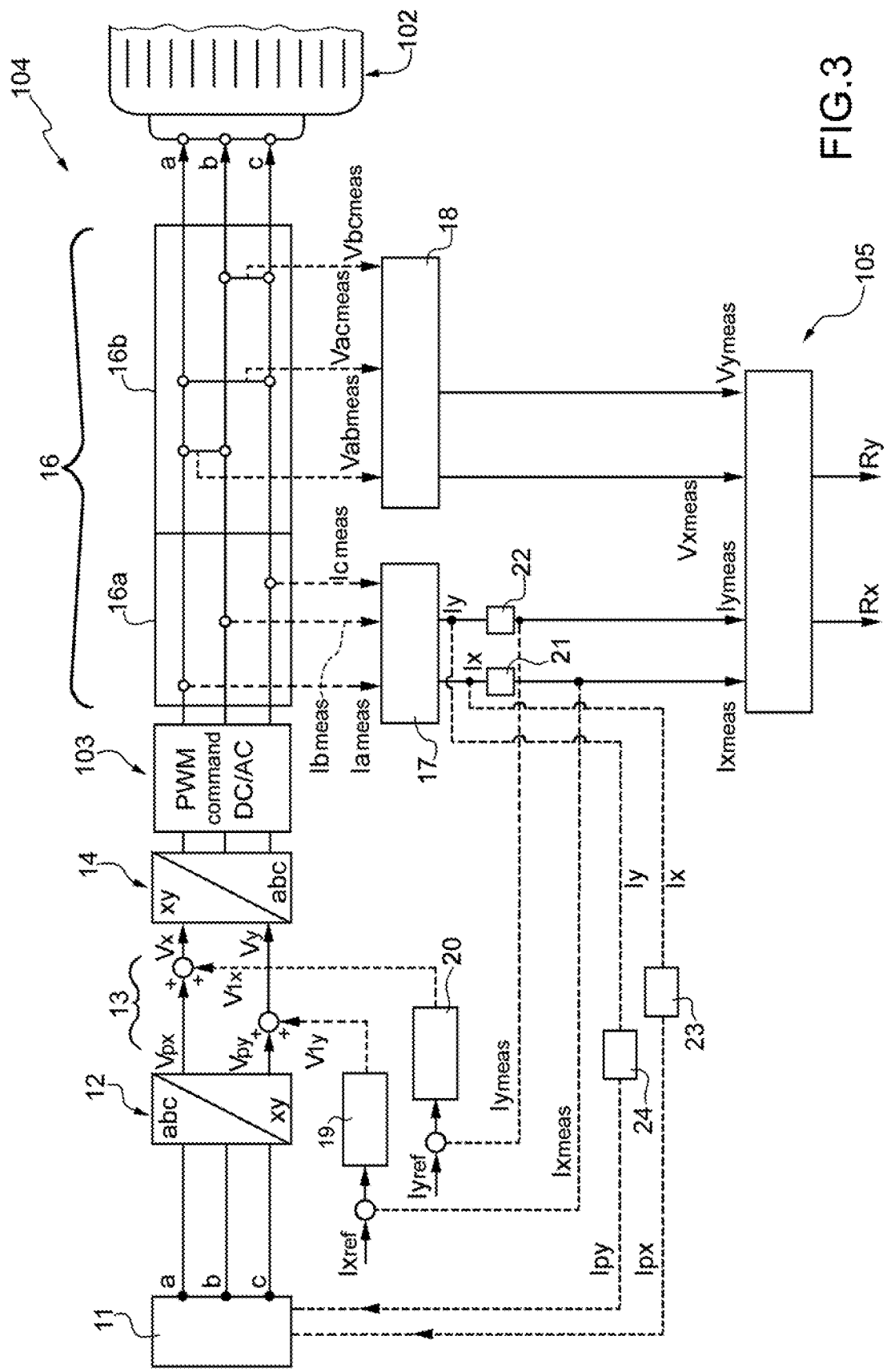
FIG. 3 shows a simplified diagram of an operating apparatus for a compressor of a refrigerating machine according to the present invention.

With particular reference to FIG. 3, a possible embodiment of the present invention is described where the disturbance signal is is injected in x-y.

It will therefore be clear to the person skilled in the art how the following description may be applied, mutatis mutandis, to the cases where the disturbance signal is injected in the stationary alpha-beta system or in the d-q rotating system, or in a-b-c, as described above generally.

In accordance with this example, the operating apparatus 104 is connected to a power supply 11 and to the electric motor 102 so as to drive it.

The power supply 11 may comprise a power supply device for a compressor motor of the conventional type, preferably with a standard feedback-controlled inverter.

In succession, from the connection to the power supply 11 of the electric motor, the operating apparatus 104 comprises:
- a first reference system converter 12 which performs a conversion from the a-b-c system to the x-y system;
- connections 13 for the injection of a voltage disturbance signal V1 which is injected in the form of a first component V1$x$ thereof, which is injected into the first component Vpx of the supply voltage, and a second component V1$y$ which is injected into the second component Vpy of the supply voltage;
- a second reference system converter 14 which performs a conversion from a-b-c to the x-y system so as to supply the electric motor 102 in three phases where the voltages at the phases a, b and c are derived from the conversion of the total voltage signals Vpx+V1$x$, in the component x, ad Vpy+V1$y$, in the component y;
- an AC/DC PWM controller, which may define the supply device 103;
- a measuring device 16 which comprises a current meter 16$a$ and a voltage meter 16$b$ both connected to the phases of the electric motor 102 to detect respectively the phase currents Ia, Ib and Ic and the line-to-line voltages Vab, Vac and Vbc and to derive from these the x and y components, in DC, of the resulting current signal I2, named Ia-meas, Ib-meas and Ic-meas, and the x and y components of the resulting voltage signal V2, in DC, named Vab-meas, Vac-meas and Vbc-meas, where "DC signal or component" is understood as meaning a direct voltage signal in the case of alpha-beta injection, or a rotating signal, and therefore having a modulus with constant value multiplied by a sine($\theta$), in the case of d-q injection, where $\theta$ is the angle of rotation of the rotor of the electric motor 102.

The voltage meter 16$b$, in particular, may be provided with the aforementioned filtering unit, which in FIG. 3 is denoted overall by the reference number 116 which, as already described, may be configured to perform, on each line-to-line voltage Vab, Vac and Vbc, a first low-pass filtering operation, for example by means of a resistive-capacitive filter and, thereafter, a second low-pass filtering operation, for example by means of an operational amplifier low-pass filter, so as to isolate and amplify the DC component of the voltages measured, thus obtaining Vab-meas, Vac-meas and Vbc-meas.

The current meter 16$a$, in particular, may be configured to perform is a low-pass filtering operation so as to isolate the DC component of the measured currents and thus obtain Ia-meas, Ib-meas and Ic-meas.

Clearly it is possible to provide:
- a third converter 17 adapted to convert the direct current components Ia-meas, Ib-meas and Ic-meas into the x-y system and thus obtain the components Ix-meas and Iy-meas of the resulting current signal I2, which can be attributed to the disturbance in the first component V1$x$ and to the disturbance in the second component V1$y$;
- a fourth converter 18 adapted to convert the direct current components Vab-meas, Vac-meas and Vbc-meas into the system x-y and thus obtain the components Vx-meas and Vy-meas of the resulting voltage signal V2, which can be attributed to the disturbance in the first component V1$x$ and to the disturbance in the second component V1$y$.

The filtering unit 116 may comprise 3 filtering stages.

Figure 4:
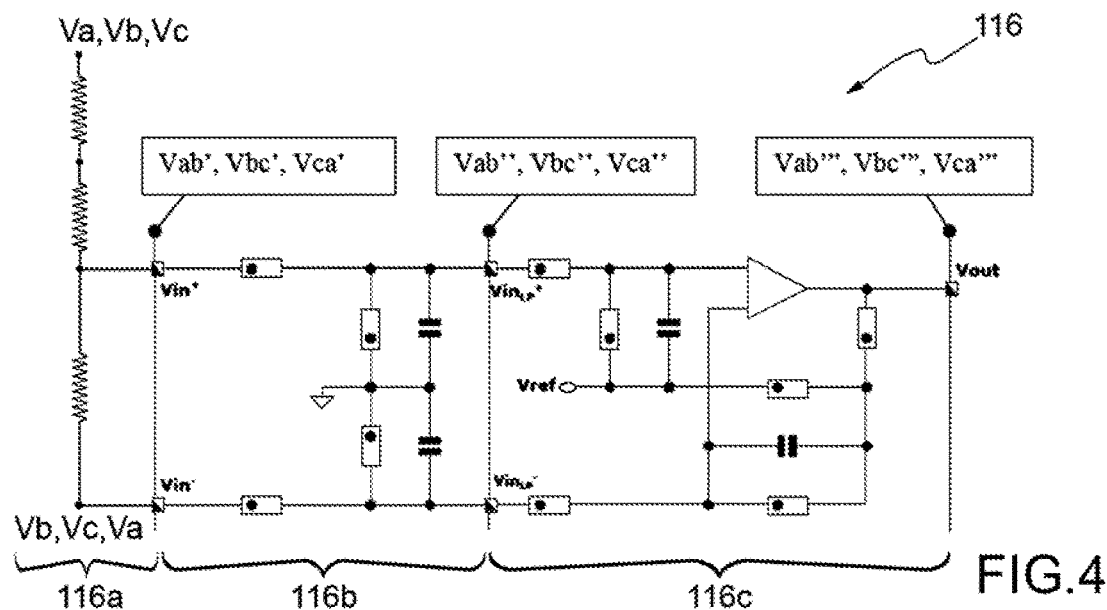
FIG. 4 shows a layout of a filtering unit of a filtering unit of an operating apparatus of a refrigerating machine compressor according to the present invention.

In particular, as shown for example by way of a non-limiting example in FIG. 4, the filtering unit may comprise:
- a first filtering stage 116$a$ which may comprise a simple resistive divider or a voltage sensor capable of measuring the direct and alternating voltage, which will have the function necessary for reducing the voltage value from high (for example 400 V) to low (for example 15V); FIG. 3$a$ shows an example of the progression of a line-to-line voltage (Vab', Vbc', Vca') downstream of the first stage.

a second stage 116b which may comprise a low-pass RC filtering stage of the first order, designed to eliminate the high-frequency PWM signal and allow the DC signal to pass through unaltered, attenuating the residual AC signal of the frequency of the electric motor 102; FIG. 3b shows an example of the progression of the same line-to-line voltage (Vab", Vbc", Vca") downstream of the second stage;

a third stage 116c designed to amplify the DC signal and eliminate further that residual AC signal, adding an offset with the aim of converting the measurement interval, for example from 0-5 V or 0-3.3V; FIG. 3c shows an example of the progression of the same line-to-line voltage (Vab''', Vbc''', Vca''') downstream of the third stage.

FIG. 4 shows, by way of a non-limiting example, a lay-out for a possible realization of the first stage 116a, the second stage 116b and the third stage 116c which, in this example, consists of a circuit with an operational amplifier.

Figure 3A:
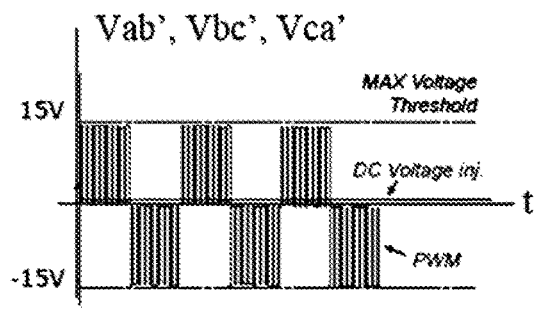
FIGS. 3a, 3b and 3c show diagrams of the progression of line-to-line voltages in a filtering unit of an operating apparatus of a refrigerating machine compressor according to the present invention.
Figure 3B:
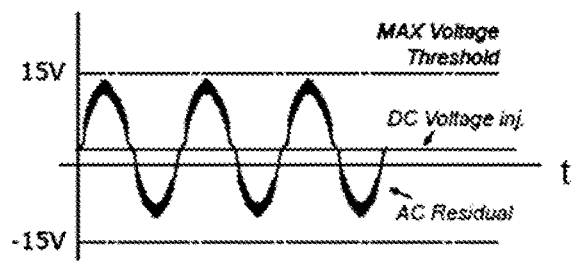
Figure 3C:
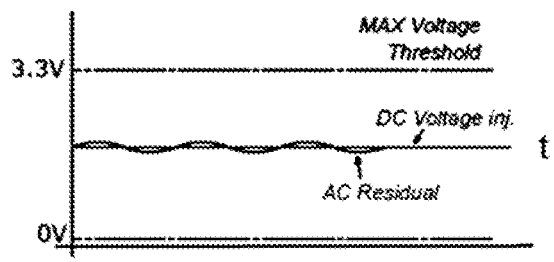

FIG. 4 also shows, at the input and output of the second stage 116b and the third stage 116c, respectively, the voltages referred to as (Vab', Vbc', Vca'), (Vab", Vbc", Vca") and (Vab''', Vbc''', Vca''') which are correspondingly shown in FIGS. 3a, 3b and 3c.

The detection device 105 may be configured to detect Rx=(Vx-meas/Ix-meas) and Ry=(Vy-meas/Iy-meas) and to derive from these an estimate of the average temperature of the windings of the electric is motor 102. as already described above, where Vx-meas, Ix-meas, Vy-meas and Iy-meas are the modules of the respective components Vx-meas, Ix-meas, Vy-meas and Iy-meas.

First output filters 21 and 22 may be provided upstream of the detection device 105.

These will each comprise a low-pass filter, for identifying the direct current components of the signals, in the case where the x-y system is a stationary alpha-beta system, or a high-pass filter in the case where the x-y system is a d-q rotating system, for detecting the rotating disturbance signal, which has a sinusoidal progression. Preferably, the aforementioned current regulators 19 and 20 will also be provided, these being configured to define the value, respectively, of the disturbance in the first component V1x and the disturbance in the second component V1y on the basis of a current intensity defined respectively:

as a function of a reference direct current value Ix-ref in x and the component x of current Ix-meas, for defining the disturbance in the first component V1x;

as a function of a reference direct current value Iy-ref in y and the component y of current Iy-meas, for defining the disturbance in the second component V1y.

Second output filters, indicated by the reference numbers 23 and 24 respectively in FIG. 3, may be provided upstream of the current regulators 19, 20.

The second output filters 23 and 24 may be high-pass filters in the case where the system x-y is a stationary alpha-beta system, for eliminating the direct current disturbance component, or a low-pass filter in the case where the x-y system is a d-q rotating system, for eliminating the rotating disturbance component in d-q which is rotating.

In this way it is possible to ensure in a reliable manner that the current correspondingly induced in the windings of the electric motor 102 by the disturbances in the first component V1x and in the second component V1y is for example not greater than 10% of the nominal current of the electric motor 102 so as to not interfere with the functionality thereof.

The electric motor 102 may be a synchronous electric motor for example of the permanent magnet or brushless type.

It has therefore been shown how the present invention is able to achieve the predefined task and objects.

The invention thus conceived may be subject to numerous modifications and variations, all of which fall within the scope of protection of the attached claims.

Moreover, all the details may be replaced by other technically equivalent elements.

In practice the materials used, as well as the particular forms and dimensions, may be varied depending on the particular requirements and the state of the art.

Where the constructional characteristics and the techniques mentioned in the following claims are followed by reference numbers or symbols, these reference numbers or symbols have been appended with the sole aim of facilitating understanding of the said claims and, consequently, they do not in any way place a limitation on the interpretation of the each element identified, purely by way of example, by said reference numbers or symbols.

The invention claimed is:

1. An operating method (10) for a compressor (101) of a refrigerating machine (100), said compressor (101) comprising an electric motor (102) and a power supply device (103) configured to modulate a supply voltage (V) and/or current (I) and/or frequency (F) for driving said electric motor (102); said method (10) being characterized by the following steps:

setting (A) a stator resistance calibration value (Ro) and at least one threshold value (S1, S2, S3, S4) for a control parameter (R), said threshold value (S1, S2, S3, S4) being correlated to said calibration value (Ro);

injecting (B), continuously during operation of said electric motor (102), a disturbance signal (V1, I1) into said electric motor (102) by means of said power supply device (103), said disturbance signal (V1, I1) consisting of a disturbance of said supply voltage (V) and/or current (I);

detecting (C), by means of voltage and current measurements at the phases of said electric motor (102), a resulting voltage signal (V2) and a resulting current signal (I2), corresponding to said disturbance signal (V1, I1);

associating (D) with said control parameter (R) a value calculated as a function of said resulting voltage signal (V2) and the resulting current signal (I2);

regulating or interrupting (E) said supply voltage (V) and/or current (I) and/or frequency (F) depending on the value of said control parameter (R) with respect to said at least one threshold value (S1, S2, S3, S4);

wherein said electric motor (102) is a three-phase motor; said disturbance signal (V1) being a voltage signal;

wherein said disturbance signal (V1) is a voltage signal consisting of a disturbance in a first component V1x and/or a disturbance in a second component V1y in a system with two orthogonal components x, y;

said supply voltage (V) having a first component Vpx and a second component Vpy in said system with two components x, y;

said injection step (B) involving injecting said disturbance signal (V1) selectively in a first mode, in a second mode or in a third mode, wherein:

said first mode involves injecting said disturbance in the first component V1x into said first component Vpx;

said second mode involves injecting said disturbance in the second component V1$y$ into said second component Vpy;

said third mode involves injecting said disturbance in the first component V1$x$ into said first component Vpx and said disturbance in the second component V1$y$ into said second component Vpy;

said step of detecting (C) a resulting signal (I2) involving measuring phase currents Ia, Ib, Ic of said electric motor (102), deriving equivalent currents Ix, Iy from said phase currents Ia, Ib, Ic by means of conversion of said phase currents Ia, Ib, Ic into said system with two components x, y and deriving from said equivalent currents Ix, Iy respective components Ix-meas and/or Iy-meas corresponding to said disturbances in the first component V1$x$ and/or in the second component V1$y$, respectively;

said detection step (C) comprising selectively:

deriving said current component Ix-meas, of the equivalent current Ix, if said disturbance signal (V1) has been injected in said first mode, deriving said current component Iy-meas, of the equivalent current Iy, if said disturbance signal (V1) has been injected in said second mode, deriving both said current components Ix-meas and Iy-meas if said disturbance signal (V1) has been injected in said third mode; wherein said method comprises a derivation operation which involves selectively determining:

a component x of voltage Vx-meas, if said disturbance signal (V1) has been injected in said first mode, or a component y of voltage Vy-meas, if said disturbance signal (V1) has been injected in said second mode, or the component x of voltage Vx-meas and the component y of voltage Vy-meas, if said disturbance signal (V1) has been injected in said third mode;

wherein said component x of voltage Vx-meas and/or said component y of voltage Vy-meas are derived by means of a processing operation which involves measuring at least one line-to-line stator voltage Vab, Vbc, Vca between terminals of the phases of said electric motor (102);

determining a direct current component for each of said at least one line-to-line voltages Vab, Vbc, Vca;

wherein the value associated with said control parameter (R) is an electrical resistance value calculated, by Ohm's law, selectively:

as the ratio between the component x of voltage Vx-meas and said component x of current Ix-meas where said component x of voltage Vx-meas is calculated on the basis of at least one of said direct current components of said at least one line-to-line voltage Vab, Vbc, Vca, if said disturbance signal (V1) has been injected in said first mode, as the ratio between the component y of voltage Vy-meas and said component y of current Iy-meas where said component y of voltage Vy-meas is calculated on the basis of at least one of said direct current components of said at least one line-to-line voltage Vab, Vbc and/or Vca, if said disturbance signal (V1) has been injected in said second mode;

as a ratio between said component x of voltage Vx-meas and said component x of current Ix-meas and/or as the ratio between said component y of voltage Vy-meas and said component y of current Iy-meas, if said disturbance signal (V1) has been injected in said third mode.

2. The method according to claim 1, wherein in the case where said disturbance signal (V1) has been injected in said third mode, a first value and a second value are calculated for said control parameter (R), wherein a value equal to the difference between said first value and said second value is assigned to a reliability index; said first value being equal to the ratio between said component x of voltage Vx-meas and said component x of current Ix-meas; said second value being equal to the ratio between said component y of voltage Vy-meas and said component y of current Iy-meas.

3. The method according to claim 1, wherein said at least one threshold value (S1, S2) comprises at least a first upper threshold value (S1) and a second upper threshold value (S2), said step of regulating or interrupting (E) said supply voltage (V) and/or current (I) and/or frequency (F) involving:

reducing the value of said supply voltage (V) and/or current (I) and/or frequency (F) if said control parameter (R) assumes a value equal to or greater than said first upper threshold value (S1);

zeroing the value of said supply voltage (V) and/or current (I) and/or frequency (F) if said control parameter (R) assumes a value equal to or greater than said second upper threshold value (S2).

4. The method according to claim 3, wherein said at least one threshold value (S1, S2, S3, S4) also comprises at least a first lower threshold value (S3) and a second lower threshold value (S4), said step of regulating or interrupting (E) said supply voltage (V) and/or current (I) and/or frequency (F) involving:

reducing the value of said supply voltage (V) and/or current (I) and/or frequency (F) if said control parameter (R) assumes a value equal to or greater than said first lower threshold value (S3);

zeroing the value of said supply voltage (V) and/or current (I) and/or frequency (F) if said control parameter (R) assumes a value equal to or less than said second lower threshold value (S4).

5. The method according to claim 3, wherein said at least one threshold value (S2, S4) comprises at least the second upper threshold value (S2) and a second lower threshold value (S4), said step of regulating or interrupting (E) said supply voltage (V) and/or current (I) and/or frequency (F) involving zeroing the value of said supply voltage (V) and/or current (I) and/or frequency (F) if said control parameter (R) assumes a value equal to or greater than said second upper threshold value (S2) or if said control parameter (R) assumes a value equal to or less than said second lower threshold value (S4).

6. The method according to claim 1, wherein said electric motor is a synchronous motor.

7. The method according to claim 1, wherein:

said disturbance in the first component V1$x$ consists of a voltage signal generated by a current regulator on the basis of a current intensity defined as a function of a reference direct current value Ix-ref in x and of said component x of current Ix-meas;

said disturbance in the second component V1$y$ consists of a voltage signal generated by a current regulator on the basis of a current intensity defined as a function of a reference direct current value Iy-ref in y and of said component y of current Iy-meas;

wherein said reference direct current value Ix-ref in x and/or said reference direct current value Iy-ref in y are pre-set in such a way that the magnitude of said disturbance in the first component V1$x$ and the magnitude of said disturbance in the second component V1y, respectively, are such as to determine an intensity of said component x of current Ix-meas and/or an intensity of said component y of current Iy-meas which is not higher than 10% of the intensity of the said corresponding equivalent currents Ix, Iy.

8. The method according to claim 2, wherein:
said disturbance in the first component V1x consists of a voltage signal generated by a current regulator on the basis of a current intensity defined as a function of a reference direct current value Ix-ref in x and of said component x of current Ix-meas;
said disturbance in the second component V1y consists of a voltage signal generated by a current regulator on the basis of a current intensity defined as a function of a reference direct current value Iy-ref in y and of said component y of current Iy-meas;
wherein said reference direct current value Ix-ref in x and/or said reference direct current value Iy-ref in y are pre-set in such a way that the magnitude of said disturbance in the first component V1x and the magnitude of said disturbance in the second component V1y, respectively, are such as to determine an intensity of said component x of current Ix-meas and/or an intensity of said component y of current Iy-meas which is not higher than 10% of the intensity of the said corresponding equivalent currents Ix, Iy.

9. The method according to claim 1, wherein said electric motor is a balanced and symmetrical three-phase electric motor with zero sum of the line-to-line voltages and zero sum of the phase currents; said system with two orthogonal components x, y being a stationary alpha-beta system where the first component x consists of the alpha component and the second component y consists of the beta component; said disturbance signal (V1) being a direct voltage signal.

10. The method according to one of claim 1, wherein said electric motor is a balanced and symmetrical three-phase electric motor with zero sum of the line-to-line voltages and zero sum of the phase currents; said system with two orthogonal components x, y being a d-q rotating system where the first component x consists of the component d and the second component y consists of the component q; said disturbance signal (V1) being an alternating voltage signal with a frequency equal to the rotation frequency of said electric motor (102).

11. An operating apparatus (104) for a compressor (101) of a refrigerating machine (100), wherein said compressor (101) comprises an electric motor (102); said operating apparatus (104) comprising a power supply device (103) configured to modulate a supply voltage (V) and/or current (I) and/or frequency (F) for driving said electric motor (102);
said operating apparatus (104) being characterized in that it comprises a detection device (105) which is set by defining a stator resistance calibration value (Ro) and at least one threshold value (S1, S2, S3, S4) for a control parameter (R), said at least one threshold value (S1, S2, S3, S4) being correlated to said calibration value (Ro); said detection device (105) being configured so as to perform, during operation of said electric motor (102), a method comprising:
injecting (A), continuously during operation of said electric motor (102), a disturbance signal (V1, I1) into said electric motor (102) by means of said power supply device (103), said disturbance signal (V1, I1) consisting of a disturbance of said supply voltage (V) and/or current (I);
detecting (B), by means of voltage and current measurements at the phases of said electric motor (102), a resulting voltage signal (V2) and a resulting current signal (I2), corresponding to said disturbance signal (V1, I1);
associating (C) with said control parameter (R) a value calculated as a function of said resulting voltage signal (V2) and the resulting current signal (I2);
regulating or interrupting (D) said supply voltage (V) and/or current (I) and/or frequency (F) depending on the value of said control parameter (R) with respect to said at least one threshold value (S1, S2, S3, S4);
wherein said electric motor (102) is a three-phase motor;
said disturbance signal (V1) being a voltage signal;
wherein said disturbance signal (V1) is a voltage signal consisting of a disturbance in a first component V1x and/or a disturbance in a second component V1y in a system with two orthogonal components x, y;
said supply voltage (V) having a first component Vpx and a second component Vpy in said system with two components x, y;
said injection step (A) involving injecting said disturbance signal (V1) selectively in a first mode, in a second mode or in a third mode, wherein:
said first mode involves injecting said disturbance in the first component V1x into said first component Vpx;
said second mode involves injecting said disturbance in the second component V1y into said second component Vpy;
said third mode involves injecting said disturbance in the first component V1x into said first component Vpx and said disturbance in the second component V1y into said second component Vpy;
said step of detecting (B) a resulting signal (I2) involving measuring phase currents Ia, Ib, Ic of said electric motor (102), deriving equivalent currents Ix, Iy from said phase currents Ia, Ib, Ic by means of conversion of said phase currents Ia, Ib, Ic into said system with two components x, y and deriving from said equivalent currents Ix, Iy respective components Ix-meas and/or Iy-meas corresponding to said disturbances in the first component V1x and/or in the second component V1y, respectively;
said detection step (B) comprising selectively:
deriving said current component Ix-meas, of the equivalent current Ix, if said disturbance signal (V1) has been injected in said first mode,
deriving said current component Iy-meas, of the equivalent current Iy, if said disturbance signal (V1) has been injected in said second mode,
deriving both said current components Ix-meas and Iy-meas if said disturbance signal (V1) has been injected in said third mode; wherein said method comprises a derivation operation which involves selectively determining:
a component x of voltage Vx-meas, if said disturbance signal (V1) has been injected in said first mode, or
a component y of voltage Vy-meas, if said disturbance signal (V1) has been injected in said second mode, or
the component x of voltage Vx-meas and the component y of voltage Vy-meas, if said disturbance signal (V1) has been injected in said third mode;
wherein said component x of voltage Vx-meas and/or said component y of voltage Vy-meas are derived by means of a processing operation which involves measuring at least one line-to-line stator voltage Vab, Vbc, Vca between terminals of the phases of said electric motor (102);

determining a direct current component for each of said at least one line-to-line voltages Vab, Vbc, Vca;

wherein the value associated with said control parameter (R) is an electrical resistance value calculated, by Ohm's law, selectively:

as the ratio between the component x of voltage Vx-meas and said component x of current Ix-meas where said component x of voltage Vx-meas is calculated on the basis of at least one of said direct current components of said at least one line-to-line voltage Vab, Vbc, Vca, if said disturbance signal (V1) has been injected in said first mode, as the ratio between the component y of voltage Vy-meas and said component y of current Iy-meas where said component y of voltage Vy-meas is calculated on the basis of at least one of said direct current components of said at least one line-to-line voltage Vab, Vbc and/or Vca, if said disturbance signal (V1) has been injected in said second mode;

as a ratio between said component x of voltage Vx-meas and said component x of current Ix-meas and/or as the ratio between said component y of voltage Vy-meas and said component y of current Iy-meas, if said disturbance signal (V1) has been injected in said third mode.

12. The operating apparatus (104) according to claim 11 which comprises, in succession, from a connection to a power supply (11) to the electric motor (102):

a first reference system converter (12) which performs a conversion from an a-b-c system to an x-y system;

connections (13) for the injection of the voltage disturbance signal V1 which is injected in the form of the first component V1x thereof, which is injected into the first component Vpx of the supply voltage, and the second component V1y thereof which is injected into the second component Vpy of the supply voltage;

a second reference system converter (14) which performs a conversion from the a-b-c system to the x-y system so as to supply the electric motor (102) in three phases where the voltages in the phases a, b and c are derived from the conversion of a sum of the first component Vpx and the first component V1x, in the component x, and a sum of the second component Vpy and the second component V1y, in the component y;

said power supply device (103) consists of an AC/DC PWM controller;

a measuring device (16) comprising a current meter (16*a*) and a voltage meter (16*b*) adapted to be connected to the phases of the electric motor (102) and configured to detect respectively the phase currents Ia, Ib and Ic and the line-to-line voltages Vab, Vac and Vbc and to derive from these the x and y components, in DC, of the resulting current signal I2, named Ia-meas, Ib-meas and Ic-meas, and the x and y components of the resulting voltage signal V2, in DC, named Vab-meas, Vac-meas and Vbc-meas.

13. The operating apparatus (104) according to claim 12, wherein said voltage meter (16*b*) is provided with a filtering unit (116) configured to perform, on each line-to-line voltage, Vab, Vac and Vbc, a voltage reduction, by means of a voltage divider, a first low-pass filtering operation, preferably by means of a resistive-capacitive filter, and, subsequently, a second low-pass filtering operation, by means of an operational amplifier low-pass filter, so as to isolate and amplify the DC component of the measured voltages, to obtain the x and y components of the resulting voltage signal V2, in DC Vab-meas, Vac-meas and Vbc-meas.

14. The operating apparatus (104) according to claim 13, wherein said filtering unit (116) comprises three filtering stages, namely:

a first filtering stage (116*a*) comprising a simple resistive divider or a voltage sensor capable of measuring the direct, alternating and PWM voltage, so as to reduce the voltage value from high to low;

a second filtering stage (116*b*) comprising a filtering stage R, or first-order low-pass filter, for eliminating a high frequency PWM signal, leaving a DC signal unchanged and attenuating a residual AC signal of the frequency of the electric motor (102);

a third filtering stage (116*c*) suitable for isolating and amplifying the DC signal and further eliminating that residual AC signal by adding an offset so as to convert a measurement interval; said third stage being realized by means of a circuit with an operational amplifier.

15. The operating apparatus (104) according to claim 13, wherein said current meter (16*a*) is configured in such a way as to perform a low-pass filtering operation so as to isolate the DC component of the measured currents in order to obtain the x and y components, in DC, of the resulting current signal I2 Ia-meas, Ib-meas and Ic-meas.

16. The operating apparatus (104) according to claim 12 which comprises:

a third converter (17) adapted to convert the resulting current signal I2, named Ia-meas, Ib-meas and Ic-meas the x-y system and thus obtain components Ix-meas and Iy-meas of the resulting current signal I2, which is attributed to the disturbance in the first component V1x and to the disturbance in the second component V1y;

a fourth converter (18) adapted to convert the resulting voltage signal V2, in DC, named Vab-meas, Vac-meas and Vbc-meas into the x-y system so as to obtain the components Vx-meas and Vy-meas of the resulting voltage signal V2, which is attributed to the disturbance in the first component V1x and to the disturbance in the second component V1y.

17. The operating apparatus (104) according to claim 12, wherein, upstream of said detection device (105) and of current regulators (19, 20), the operating apparatus (104) comprises first output filters (21, 22) which each comprise a low-pass filter, for identifying the direct current components of the signals, in the case where said x-y system is a stationary alpha-beta system, or a high-pass filter, in the case where said x-y system is a d-q rotating system, for detecting a rotating disturbance signal, which has a sinusoidal pattern.

18. The operating apparatus (104) according to claim 16, wherein said power supply (11) comprises a feedback driven inverter, said third converter (17) being connected in feedback to said power supply (11) via second output filters (23, 24), each of these comprising a high-pass filter, in the case where said x-y system is a stationary alpha-beta system, for eliminating the direct current disturbance component, or a low-pass filter, in the case where said x-y system is a d-q rotating system, for eliminating the disturbance signal in d-q which is rotating.

19. The operating apparatus (104) according to claim 11, wherein said electric motor (102) is a synchronous motor.

20. A refrigerating machine comprising at least one condenser member (106), at least one evaporator member (107), at least one throttling member (108) and at least one compressor (101) where the latter is equipped with an operating apparatus (104) according to claim 11.

\* \* \* \* \*